Nov. 25, 1952    E. A. HAMACHER    2,619,600
X-RAY SPECTROMETRY
Filed July 13, 1950

EDWARD A. HAMACHER
INVENTOR.

BY *Ted M Vogel*

AGENT.

Patented Nov. 25, 1952

2,619,600

UNITED STATES PATENT OFFICE 2,619,600

X-RAY SPECTROMETRY

Edward A. Hamacher, North Tarrytown, N. Y., assignor to Philips Laboratories, Inc., Irvington-on-Hudson, N. Y.

Application July 13, 1950, Serial No. 173,626

12 Claims. (Cl. 250—52)

1

The present invention relates to X-ray spectrometry, and more particularly to the measurement of X-ray diffraction intensities by the use of a Geiger-Muller tube.

In the study and analysis of chemical compositions by means of the X-ray diffraction technique, it is known to measure the relative intensities of lines on the diffraction pattern by the use of a Geiger-Muller tube as the radiation-sensitive element. By reason of the fundamental statistical nature of the emission of X-ray quanta, data recorded with a Geiger-Muller tube is subject to error. For instance, a total of 100 quanta can be determined with a probable-error of ±7%. On the other hand, a total of 5000 quanta can be determined with an appreciably smaller probable-error of ±1%. Thus should the X-ray quanta emitted during a constant interval of time be measured at equispaced angular points to produce a complete diffraction pattern representing the counting rate or intensity vs. Bragg angle, the probable-error of measurement would depend on the intensity measured, and the resultant pattern would be lacking in accuracy.

The simplest procedure for measuring diffraction data with a constant percentage of error is to set the Geiger-Muller tube goniometer at a particular Bragg angle and then measure the time required to totalize a predetermined number of quanta. The time interval thus measured is inversely proportional to the counting rate. This method, which entails the manual shifting of the goniometer in small increments throughout the measuring range, as well as the calculation of counting rate at every angle, is obviously both laborious and time consuming.

Accordingly, the principal object of the present invention is to provide apparatus for determining automatically a complete diffraction pattern with a constant predetermined percentage of error.

More particularly, the object of this invention is to provide automatic means for determining a complete diffraction pattern representing counting rate vs. Bragg angle wherein each point of the graph is indicative of a counting rate having a constant percentage of error.

A significant feature of the invention involves the conversion of the time interval required to count a fixed number of quanta at a given angular position into an electrical value inversely proportional to said time interval and directly proportional to the counting rate, which electrical value governs the position of a recording pen. At the conclusion of each count and subsequent to the recordation of the counting rate, the Geiger-Muller goniometer is caused to shift automatically to the next angular position, the shifting occurring in successive, equally spaced steps throughout the angular range of measurement.

For a better understanding of the present invention as well as other objects and further features thereof, reference is made to the following detailed description thereof to be read in conjunction with the accompanying drawing wherein.

Figure 1:
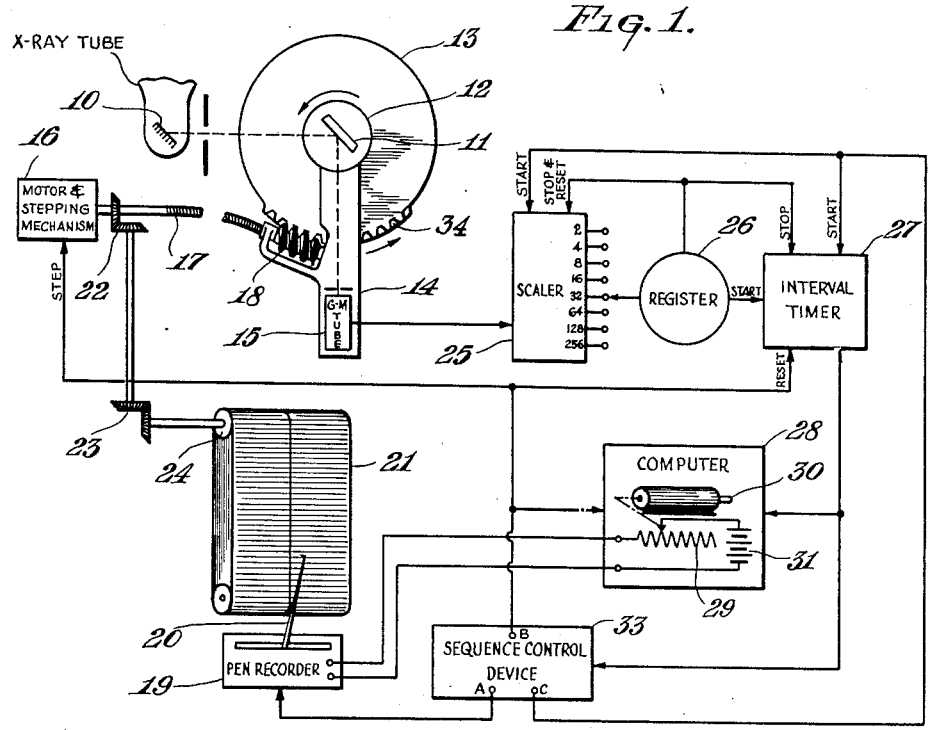
Fig. 1 is a schematic diagram of one preferred embodiment of the invention.

Referring now to Fig. 1 a preferred embodiment of apparatus in accordance with the invention comprises a source of X-rays including an X-ray target 10 which projects an X-ray beam onto a crystal 11 of the material to be studied. The crystal 11 is mounted on a specimen table 12 disposed centrally on a fixed, circular spectrometer table 13. The crystal is so mounted that it may be rotated about an axis passing through the center of table 13 and normal to its plane. An arm 14 extends radially from said axis and is mounted to rotate with specimen table 12 carrying the crystal but to move through twice the angle of movement of specimen table 12. Secured to arm 14 is a Geiger-Muller tube 15 for intercepting the rays deflected by the crystal specimen.

Rotation of arm 14 and specimen table 12 is effected in a stepwise manner by means including a motor coupled to a stepping mechanism 16 which, when actuated, drives via a flexible cable 17 a worm 18 meshing with teeth 34 formed along the periphery of the spectrometer table 13. For each step of mechanism 16 the arm 14 is shifted in angular position a single increment which may, for example, be .01°. Hence, assuming that the arm is to be driven through 160° in .01° increments, the stepping mechanism 16 would have to be actuated 16,000 times. The stepping mechanism may be constituted by any suitable device for this purpose such as a Geneva movement or an escapement in which the pallet or detent is controlled by an electromagnetic device.

The pattern derived from the Geiger-Muller tube is produced by a pen recorder 19 provided with a stylus 20 engaging a moving chart 21. In order synchronously to indicate the azimuthal position of arm 14 and the intensity of the Geiger-Muller response, shaft 17 of the stepping mechanism is coupled by suitable gears 22 and 23 to the roller 24 carrying the movable chart 21. Thus each time arm 14 is shifted one increment, chart 21 is likewise shifted in position.

The quanta yielded by the Geiger-Muller tube is fed to a scaler circuit 25 which acts to scale down the random phenomena to a desired ratio. The scaler is preferably constituted by binary stages connected in cascade relation. Thus if the scale incorporates 8 stages, the quanta will be scaled down by a factor of 256. One scaling circuit suitable for this purpose is fully disclosed in my copending application S. N. 77,394, filed February 19, 1949.

In order to determine the period of time required for a predetermined number of counts, one stage of the scaler is coupled to a mechanical impulse register 26 which totalizes the scaler output. When the desired number of counts is registered, the register acts instantly to stop and reset the scaler in preparation for the next measurement. For example, assuming that it is desired to measure the period required to count 320 counts, this may be accomplished by coupling the register to the fifth stage of the scaler providing a 32 to 1 ratio so that upon receipt of the tenth pulse therefrom the register will arrest and reset the scaler. The elapsed time for the predetermined count is indicated directly by a timing clock 27 which is actuated at the instant the scaler begins to operate and is cut-off at the instant the scaler is stopped.

As pointed out above, for fixed count operation, the time interval is inversely proportional to the counting rate. Hence $$t = \frac{K}{x}$$

where $t$ is the time interval measured, $K$ the fixed number of counts and $x$ the counting rate. As the chart must exhibit the counting rate or diffraction intensity relative to the Bragg angle, it is obvious that the inverse of time must be recorded to afford a reading of counting rate. This is effected by means of a computer 28 for converting the time period into an electrical value inversely proportional to time and directly proportional to counting rate.

Computer 28, providing the reciprocal of time, is constituted by a variable resistor 29 whose adjustable tap is driven by a mechanism 30 the operation of which is controlled by timer 27, the mechanism 30 acting to increase the value of resistor 29 to an extent depending on the time interval of the fixed count. A resistor 29 is connected in series with a constant voltage source 31. Consequently, as the series resistance increases with time, the current through resistor 29 is inversely proportional to time. This is evident from Ohms law wherein $$I = \frac{E}{R}$$

I being the current through resistor 29, E being the constant voltage from source 30, and R being the particular value of the resistor 29. The current thus developed is fed through pen recorder 19, to deflect the position of stylus 20 accordingly.

For the purpose of coordinating the operation of the various elements in the system and effecting automatic measurement, a sequence control device 33 is provided which is coupled to timer 27 and proceeds to operate at the conclusion of the fixed count time interval. The sequence control device may take any known form. For example, it may be constituted by a motor driving a reduction gear mechanism adapted after a first predetermined number of motor revolutions to actuate a first switch, after a second predetermined number of revolutions to actuate a second switch, and after a third predetermined number of revolutions to actuate a third switch, thereby carrying out the switching functions in the desired sequence. The actual structure of the sequence control device forms no part of the present invention, it being obvious that many arrangements are possible for performing this function.

The functioning of the sequence control device is best understood by first considering the behavior of the entire system when it is first set into operation. The Geiger-Muller goniometer is set in the region of Bragg angles to be studied. The scaler 25, interval timer 27 and computer 28 are turned on simultaneously. When the predetermined number of counts has been registered and totalized, the register turns off the interval timer and the computer 28 is simultaneously arrested. Interval timer 27 indicates the elapsed time and the final value of resistor 29 in computer 28 is proportional thereto. Hence the current through recorder 19 is inversely proportional to the time interval or directly proportional to the counting rate (or intensity) associated with the Bragg angle to which the goniometer is adjusted.

When the timer 27 is turned off, sequence control device 33 is actuated and proceeds to carry out the following functions in successive order:

First (A), it actuates the pen recorder 19 to cause the stylus thereof to bear down on the recording chart to impress thereon a dot, a small cross or a circle. Or if the recorder is of the type where the stylus normally rests on the chart, the control device may act to complete a connection between computer 28 and the recorder controlling the stylus causing a short mark to be made on chart 21. In this connection it may be noted that a standard Brown Instrument Co. or any other type of strip chart recorder may be employed.

Second (B), it actuates the stepping mechanism 16 to advance both the goniometer and the strip chart 21, and at the same time it resets interval timer 27 and computer 28 to their initial position.

Finally (C), the sequence control simultaneously turns on the scaler, the interval timer and the computer for the next point on the chart.

Figure 2:
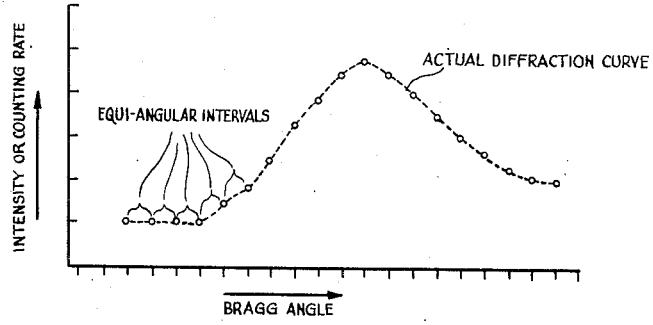
Fig. 2 illustrates a typical strip chart record produced by the apparatus of Fig. 1.
Figure 3:
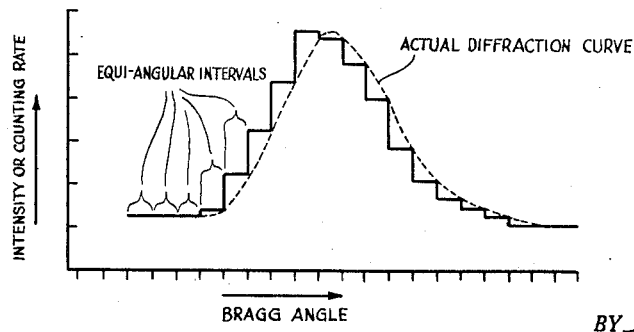
Fig. 3 illustrates another typical strip chart record produced by the apparatus of Fig. 1.

The net result of the sequential operation is that the chart, as shown in Fig. 2 contains a series of points which represent equal angular increments and show the counting rate with a predetermined probable-error for every point. If a continuous curve is preferred, the recorder may be of the type in which the stylus remains on the chart, in which case a step-type curve will be obtained as shown in Fig. 3. However if the increments are very small the step curve will appear to be virtually continuous in form.

Thus the apparatus acts automatically to scan in equally spaced steps the desired Bragg angle range. While continuous scanning systems are known, these systems, which generally employ a rate meter, give rise to error due to the time constants entailed by a rate meter. In the step scanning system herein disclosed, the problem of time lag does not exist and a more accurate pattern is produced.

In the computer 28, the resistor 29 is preferably of the type having a linear variation characteristic thereby providing a linear chart. However should hyperbolic or logarithmic readings be desired, this can readily be effected by providing a resistor having a suitable taper. While resistor 29 may be driven by its own synchronous motor in accordance with the time interval indicated by timer 27, it is also possible to drive the timer and resistor 29 by a common synchronous motor. This may be effected by way of a suitable clutch mechanism, whereby when control device 33 at sequence "B" resets resistor 29, it does this by operating the clutch to cause resistor 29 to swing back to its initial position, resistor 29 being either spring biased or driven by a motor causing it to revert to its initial position when the clutch is released.

It is obvious that the particular form taken by the sequence control device may be electrical, electromechanical or mechanical depending on the nature of the associated elements. For example, if the stepping mechanism is controllable by means of an electro-magnet, then at sequence "B," device 33 has simply to close a switch energizing the electromagnet. Similarly, the manner in which control device 33 at sequence "C" acts to start simultaneously the scaler 25 and interval timer 27 depends on the particular type of scaler and timer employed. The invention clearly is not limited to any one type of scaler or timer nor to any one means within the ability of one skilled in the art to actuate these standard components.

While there has been disclosed what is considered to be a preferred embodiment of the invention, it is obvious that many changes and modifications may be made therein without departing from the scope of the invention, and it is intended in the accompanying claims to cover all such changes and modifications as fall within the true spirit of the invention.

What is claimed is:

1. The method of determining the intensity of radiant energy diffracted by a substance under test comprising the steps of detecting said radiant energy at a predetermined angle, counting a predetermined number of quanta of the detected energy, measuring the time interval during which said predetermined number of quanta is counted, translating said time interval into an electrical value inversely proportional thereto thereby to provide an index to the counting rate of said quanta.

2. The method of determining the intensity of radiant energy diffracted from a substance under test comprising the steps of detecting said radiant energy at a predetermined angle, counting a predetermined number of quanta of the detected energy, measuring the time interval during which said predetermined number of quanta is counted, translating said time interval into an electrical value inversely proportional thereto thereby to provide an index to the counting rate of said quanta, and recording said electrical value in rectangular coordinates depending on the angle of detection and the amplitude of said electrical value.

3. The method of determining a diffraction pattern of a substance exposed to X-ray radiation comprising the steps of detecting in successive steps radiation reflected from said substance at equi-spaced Bragg angle positions within a given angular range, counting at each angular position a predetermined number of quanta of the detected radiation, measuring the time interval during which said predetermined number of quanta is counted, translating said time interval into an electrical current whose intensity is inversely proportional thereto, and recording the relation existing between each angle in said range and the intensity of electrical current developed at each angle.

4. The method of determining a diffraction pattern of a substance exposed to X-ray radiation comprising the steps of detecting in successive steps radiation reflected from said substance at equispaced Bragg angle positions within a given angular range, counting at each angular position a predetermined number of quanta of the detected radiation, converting said time interval into a resistance value proportional thereto, controlling the flow of an electrical current in accordance with said resistance value whereby the resultant current flow is inversely proportional thereto, and recording the relationship existing at each angle in said range with the intensity of the resultant current flow.

5. X-ray apparatus for determining the diffraction pattern of a substance representing counting rate vs. Bragg angle comprising an X-ray source, a radiation detector for intercepting at a given angle energy reflected from a substance exposed to said source, means coupled to said radiation detector to count the X-ray quanta intercepted thereby, means to determine the time interval elapsing during a predetermined number of counts, computer means for translating said time interval into an electrical current proportional thereto, and chart recording means responsive to said electrical current to produce an indication on said chart whose position depends on the intensity of said current and the angular position of said detector.

6. X-ray apparatus for determining the diffraction pattern of a substance representing counting rate vs. Bragg angle comprising an X-ray source, a Geiger-Muller detector for intercepting at a given angle energy reflected from a substance exposed to said source, a counter coupled to said detector to count the X-ray quanta intercepted thereby, a timer coupled to said counter to determine the time interval elapsing during a predetermined number of counts, a computer for translating said time interval into an electrical current proportional thereto, and a chart recorder responsive to said electrical current to produce an indication on said chart whose position depends on the intensity of said current and the angular position of said detector.

7. X-ray apparatus for determining the diffraction pattern of a substance representing counting rate vs. Bragg angle comprising an X-ray source, a radiation detector for intercepting energy reflected from a substance exposed to said source, a goniometer for shifting the position of said detector through a given angular range, a stepping mechanism for driving said goniometer in equal successive angular steps, a counter coupled to said radiation detector to count the X-ray quanta intercepted thereby, a timer coupled to said counter to determine the time interval elapsing during a predetermined number of counts, a computer coupled to said timer for translating said time interval into an electrical current proportional thereto, and a strip chart recorder responsive to said electrical current to produce an indication on a chart, said chart being mechanically coupled to said stepping mechanism whereby said indication has a position depending on the intensity of said current and the angular position of said detector.

8. In apparatus for determining the counting rate of radiation quanta; a timer for measuring the time interval in which a predetermined number of quanta is counted; and a computer including a variable resistor having a movable contact, a constant voltage source connected in series with said resistor, motor means for driving said contact at a uniform velocity, and means coupled to said timer for controlling said motor means to raise the value of said resistor in accordance with said time interval.

9. Apparatus as set forth in claim 8, wherein said resistor has a taper providing a logarithmic relationship between said time interval and the resultant current flow through said resistor.

10. In apparatus for determining the counting rate of radiation quanta; a timer including a synchronous motor, means governing the operation of said synchronous motor for a period depending upon the time interval in which a predetermined number of quanta is counted; and a computer including a resistor having a movable contact, a constant voltage source connected in series with said resistor, and means coupling said movable contact to said synchronous motor whereby the value of said resistor is inversely proportional to said time interval.

11. An X-ray spectrometer comprising an X-ray source, a radiation detector, means for adjusting the angular position of said detector, a stepping mechanism coupled to said adjusting means to shift the position thereof successively in equi-spaced angular increments, a resettable counter coupled to said detector for counting the number of quanta intercepted thereby, an impulse register coupled to said counter to stop and reset said counter upon totalizing a predetermined count, a resettable timer coupled to said register to measure the time interval elapsing during said predetermined count, a resettable computer coupled to said timer for translating said time interval into an electrical current whose intensity is inversely proportional thereto, a strip chart recorder having a deflectable stylus engaging a movable chart, said movable chart being coupled to said stepping mechanism for synchronous movement with said detector, and a sequence control device coupled to said timer to perform the following sequential operation upon the conclusion of said time interval: first, to render the deflectable stylus responsive in accordance with the intensity of current yielded by said computer whereby the resulting indication represents the relationship between angle and counting rate; second, to actuate said stepping mechanism to advance both said detector adjusting means and said strip chart and at the same time to reset said interval timer and said computer; third, to simultaneously render operative said scaler, said interval timer and said computer for the next reading.

12. An X-ray spectrometer comprising an X-ray source, a Geiger-Muller detector, a goniometer for adjusting the angle position of said detector relative to a substance to be tested, a stepping mechanism coupled to said goniometer to shift the position thereof successively in equi-spaced angular steps, a resettable binary counter coupled to said detector to count the number of quanta intercepted thereby, an impulse register coupled to said counter to stop and reset said counter upon totalizing a predetermined number of quanta, a timer coupled to said register to measure the time interval elapsing during said predetermined number of counts, a resettable computer including a time-responsive variable resistor coupled to said timer for translating said time interval into an electrical current whose intensity is inversely proportional thereto, a step chart recorder having a deflectable stylus engaging a movable chart, said movable chart being coupled to said stepping mechanism to effect synchronism between the position of said chart and the angular position of said detector, and a sequence control device coupled to said timer to perform the following sequential operations upon the termination of said time interval: first, to render the deflectable stylus responsive in accordance with the intensity of current yielded by said computer whereby the resulting indication represents the relationship between angle and counting rate; second, to actuate said stepping mechanism to advance both said goniometer and said strip chart and at the same time to reset said interval timer and said computer to their starting positions; third, to simultaneously render operative said scaler, said interval timer and said computer for the next reading.

EDWARD A. HAMACHER.

REFERENCES CITED

The following references are of record in the file of this patent:

UNITED STATES PATENTS

| Number | Name | Date |
|---|---|---|
| 1,589,833 | Behnken et al. | June 22, 1926 |
| 2,386,785 | Friedman | Oct. 16, 1945 |